United States Patent [19]

Li

[11] Patent Number: 5,283,101
[45] Date of Patent: Feb. 1, 1994

[54] LAUNDERABLE RETROREFLECTIVE APPLIQUE WITH BINDER LAYER COMPRISING ELECTRON-BEAM CURED POLYMER

[75] Inventor: Wu-Shyong Li, Woodbury, Minn.

[73] Assignee: Minnesota Mining and Manufacturing Company, St. Paul, Minn.

[21] Appl. No.: 951,905

[22] Filed: Sep. 28, 1992

Related U.S. Application Data

[63] Continuation-in-part of Ser. No. 697,264, May 8, 1991, abandoned.

[51] Int. Cl.$^5$ .................. G02B 5/128; B32B 25/02
[52] U.S. Cl. .................. 428/141; 428/143; 428/149; 428/285; 428/325; 428/346; 428/349; 428/343; 428/241; 428/447; 428/521; 428/522; 428/523; 428/442; 428/441; 359/536; 359/538; 359/539; 359/541; 359/540; 427/163; 427/166; 427/496; 427/501
[58] Field of Search .......... 428/143, 149, 141, 285, 428/325, 346, 349, 343, 241, 447, 521, 522, 523, 442, 441; 359/536, 538, 539, 541, 540; 427/163, 166, 496, 501, 505, 203; 2/244

[56] References Cited

U.S. PATENT DOCUMENTS

| | | | |
|---|---|---|---|
| 3,700,305 | 10/1972 | Bingham | 350/105 |
| 4,025,159 | 5/1977 | McGrath | 350/105 |
| 4,076,671 | 2/1978 | Bright | 428/489 |
| 4,356,233 | 10/1982 | Lange et al. | 428/450 |
| 4,533,592 | 8/1985 | Bingham | 428/325 |
| 4,637,950 | 1/1987 | Bergeson et al. | 428/325 |
| 4,678,695 | 7/1987 | Tung et al. | 428/325 |
| 4,955,690 | 9/1990 | Bacon, Jr. | 354/540 |
| 5,055,347 | 10/1991 | Bacon, Jr. | 428/250 |

FOREIGN PATENT DOCUMENTS 0255251 2/1988 European Pat. Off.

OTHER PUBLICATIONS

U.S. Defensive Publication T987,003 (Johnson et al.) Oct. 2, 1979.

*Primary Examiner*—Ellis P. Robinson
*Assistant Examiner*—William P. Watkins, III
*Attorney, Agent, or Firm*—Gary L. Griswold; Walter N. Kirn; Robert H. Jordan

[57] ABSTRACT

Retroreflective appliques comprising a monolayer of retroreflective elements partially embedded in and protruding from the front surface of a binder layer and an optional layer of adhesive on the rear surface of the binder layer for securing the applique to a garment, wherein the binder layer comprises an electron-beam cured polymer selected from the group consisting of chlorosulfonated polyethylenes, ethylene copolymers comprising at least about 70 weight percent of polyethylene, and EPDM polymers.

14 Claims, 1 Drawing Sheet

LAUNDERABLE RETROREFLECTIVE APPLIQUE WITH BINDER LAYER COMPRISING ELECTRON-BEAM CURED POLYMER

CROSS-REFERENCE TO RELATED APPLICATIONS

This is a continuation-in-part of application Ser. No. 07/697,264, filed May 8, 1991, now abandoned.

FIELD OF INVENTION

The present invention relates to novel retroreflective appliques and articles to which such appliques have been applied.

BACKGROUND

In order to improve safety of pedestrians, joggers, workers on roadways, etc., retroreflective markings have been attached to clothing. In one common embodiment, retroreflective appliques comprising a monolayer of retroreflective elements, e.g., transparent microspheres with hemispheric reflectors, partially embedded in a layer of binder material, with adhesive backings are bonded to articles of clothing.

Typically, the binder materials in such appliques comprise thermally or chemically cured compositions, e.g., phenolic cured resins, isocyanate cured polymers with active hydrogens such as two part urethanes, and aminoplast- or amine-cured hydroxy functional polymers. A problem with such appliques is that their retroreflective performance tends to diminish unacceptably when the garment to which they are bonded is washed. After a few washings, the retroreflective brightness of the applique may be reduced to a small fraction, e.g., 5 percent or less, of its original brightness. This decrease is due to loss of retroreflective elements from the surface of the applique and/or degradation of the retroreflective elements, e.g., corrosion of aluminum hemispheric reflectors, during washing.

The problem is particularly troublesome when the clothing is subjected to industrial laundering, where the conditions of laundering are often more severe than conventional home laundering. For instance, in an industrial laundry, the laundering conditions may include wash temperatures of 40° to 90° C. (105° to 190° F.) and pH of 10 to 12.5, whereas in contrast, typical conditions for home laundering may include temperatures of 4° to 60° C. (40° to 140° F.) and pH of less than 11. Also, home laundering equipment typically subjects the articles being cleaned to less rigorous handling and stress than does industrial laundry equipment.

SUMMARY OF INVENTION

The present invention provides novel retroreflective appliques which can be applied to substrates such as fabrics and garments to impart retroreflective properties thereto. The appliques of the invention provide unexpected durability. Capable of being applied to fabric substrates, appliques of the invention exhibit surprising resistance to degradation when the article is laundered and retain a surprising degree of retroreflective properties.

In brief summary, retroreflective appliques of the invention comprise a monolayer of retroreflective elements partially embedded in and protruding from the front surface of a binder layer and an optional layer of adhesive, preferably hot melt type, on the rear surface of the binder layer. The adhesive layer is optionally covered with a removable release liner. In some embodiments, the applique is bonded to a garment substrate, e.g., a piece of fabric or article of clothing, with the adhesive, and in other embodiments the binder layer serves to both secure the retroreflective elements and to bond the applique to a desired garment substrate. If desired, the applique can be sewn onto a fabric substrate. In an important distinction from previously known retroreflective appliques, the binder layer of appliques of the invention comprises a polymer crosslinked or cured by electron beam ("e-beam") radiation, the polymer being selected from the group consisting of chlorosulfonated polyethylenes, ethylene copolymers comprising at least about 70 weight percent of polyethylene, and EPDM polymers.

Retroreflective appliques of the invention have been found to exhibit surprising retention of retroreflective brightness when subjected to industrial laundering conditions. This advantageous result is achieved through a combination of increased resistance to loss of retroreflective elements and an increased resistance to degradation of the retroreflective elements, e.g., degradation of the reflector layer. As a result, articles to which appliques of the invention have been applied may be laundered many more times than previously possible while still retaining the desired retroreflective character.

BRIEF DESCRIPTION OF DRAWINGS

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
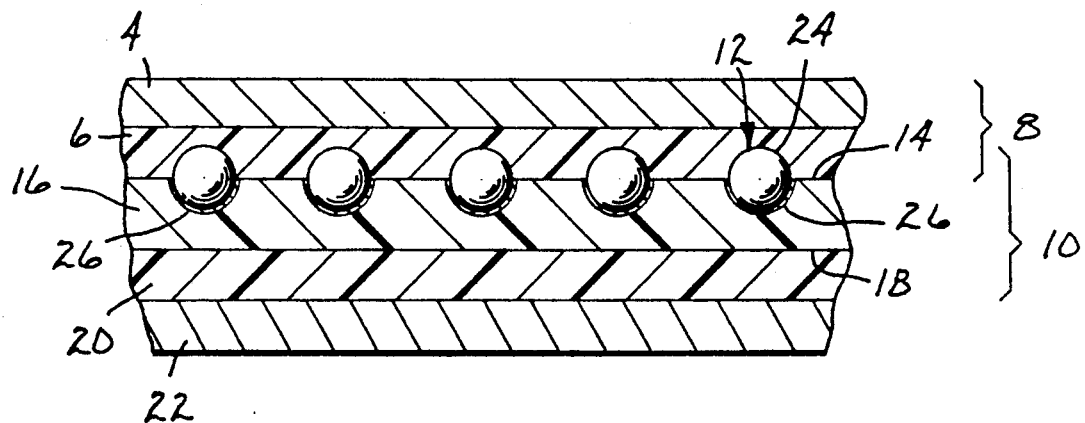
FIG. 1 is cross-sectional illustration of a portion of an illustrative embodiment of a retroreflective applique of the invention.
Figure 2:
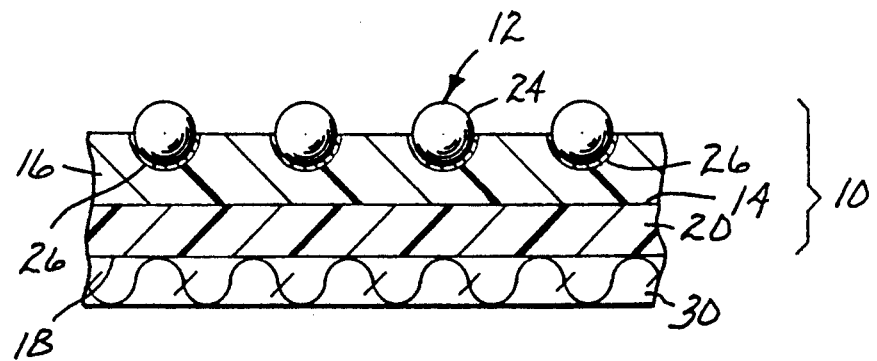
FIG. 2 is cross-sectional illustration of a portion of another illustrative embodiment of a retroreflective applique of the invention bonded to a substrate.

Reference is made to FIG. 1 wherein is shown an illustrative embodiment of retroreflective applique 10 of the invention. Applique 10 comprises a monolayer of retroreflective elements 12 partially embedded in and protruding from front surface 14 of binder layer 16. Disposed on rear surface 18 of binder layer 16 is optional adhesive layer 20. Applique 10 is shown with optional release liner 22 which covers the exposed surface of adhesive layer 20. To apply applique 10 to a substrate such as a fabric (not shown), release liner 22 is first removed. Applique 10 is also shown on optional temporary carrier 8 comprising paper sheet 4 and polymer lining 6.

In brief summary, a typical method of making appliques of the invention comprises arranging retroreflective elements in desired monolayer arrangement on a temporary carrier with the rear portions of the retroreflective elements presented away from the carrier, forming a binder layer over the rear portions of the retroreflective elements, and applying an optional adhesive layer on the back side of the binder layer.

The most typical form of retroreflective elements 12 will be spherical microspheres 24 having reflectors 26 on the back sides thereof as shown in FIG. 1. As known to those skilled in the art, one method for assembling a monolayer of such retroreflective elements is to cascade microspheres onto temporary carrier 8 which secures microspheres 24 in desired arrangement temporarily. For instance, microspheres 24 can be partially embedded in heat softenable polymer layer 6 on paper sheet 4. Some examples of useful polymer coatings include polyvinyl chloride, polysulfones, polyalkylenes such as polyethylene, polypropylene, and polybutylene, polyesters such as polyethylene terephthalate, and the like. Upon cooling, polymer layer 6 retains microspheres 24 in desired arrangement. Depending in part upon the characteristics of carrier 8 and elements 12, it may be desired to condition carrier 8 and/or elements 12 to achieve desired release properties. For instance, selected release agents or adhesion promoters may be used.

Microspheres 24 are typically preferably packed as closely as possible, ideally in their closest hexagonal arrangement, to achieve greater retroreflective brightness and may be so arranged by any convenient applique process, such as printing, screening, cascading, or with a hot can roll.

The most typical kind of retroreflective elements are transparent microspheres having reflectors on the rear surfaces thereof as shown in FIG. 1. Such retroreflective elements typically provide satisfactory levels of retroreflective brightness over a wide range of incidence angles, i.e., the angles at which the light strikes the sheeting, a property sometimes referred to as "angularity."

If transparent microspheres are used, the microspheres are preferably substantially spherical in shape to provide the most uniform and efficient retroreflection. Furthermore, the microspheres are preferably substantially transparent to minimize the amount of light absorbed by the microspheres and thereby optimize the amount of light which is retroreflected by sheetings of the invention. The microspheres are typically substantially colorless, but may be colored to produce special effects if desired.

Microspheres used herein may be made from glass or synthetic resin having the optical properties and physical characteristics taught herein. Glass microspheres are typically preferred because they typically cost less, are harder, and are more durable than microspheres made of synthetic resins.

Microspheres used in the present invention will typically have an average diameter of between about 30 and about 200 microns. Microspheres which are smaller than this range may tend to provide lower levels of retroreflection because of diffraction effects, whereas microspheres larger than this range may tend to impart undesirably rough texture to the applique or undesirably reduce the flexibility thereof. Microspheres used in the present invention will typically have a refractive index of between about 1.7 and about 2.0, the range typically considered to be useful in microsphere-based retroreflective products where, as here, the front surfaces of the microspheres are exposed or air-incident.

As mentioned above, microsphere-based retroreflective elements of retroreflective appliques of the invention typically have reflectors on the rear surfaces thereof. Typically, such reflectors are applied to the rear surfaces of the microspheres after the microspheres have been partially embedded in the carrier, thereby facilitating the arrangement of the microspheres in substantially uniform direction for retroreflection. In addition, it is well known in the art that a thin spacing layer can be disposed between the microsphere and the reflector. Furthermore, as is known, the size of reflectors, i.e., how much of the surface of the microspheres which is covered, may be controlled in part by controlling the depth into the carrier to which the microspheres are embedded prior to application of the reflectors thereto.

Among the variety of materials which may be used as reflectors are vacuum-deposited or vapor-coated metal coatings, such as aluminum or silver; chemically-deposited metal coatings, such as silver; metal-coated plastic films; metal flakes, such as aluminum or silver; and dielectric coatings. Aluminum or silver coatings are typically preferred, because they tend to provide the highest retroreflective brightness. The reflective color of silver coatings is typically preferred to that of aluminum coatings, but an aluminum vapor coat is normally more preferred, because silver reflective coatings typically suffer more severe degradation in outdoor exposure than do aluminum coatings. U.S. Pat. No. 3,700,305 (Bingham) discloses dielectric mirrors or coatings that may be used as reflectors in retroreflective articles of the invention.

An advantage of dielectric reflectors is that appliques made with microspheres having such reflectors may be easily made in a variety of bright colors. Such reflectors are typically subject to degradation under laundering conditions, particularly industrial laundering conditions, and are accordingly used on articles destined for home laundering. Aluminum and silver reflectors typically exhibit substantially greater durability under industrial laundering conditions, but aluminum reflectors often tend to impart a gray color to the applique under ambient conditions.

Following arrangement of retroreflective elements 12 on temporary carrier 8, a certain time typically elapses before a composition forming binder layer 16 is applied thereover. This time is referred to herein as the "dwell time." It is believed that longer dwell times may typically result in undesirable partial oxidation of any metallic reflectors which are present on the retroreflective elements and exposed to the ambient air. Further, as dwell times increase, moisture is typically more likely to condense on the surfaces of the retroreflective elements which are exposed to the ambient air. Partial oxidation of the metallic reflectors and the presence of moisture on the exposed surfaces of the retroreflective elements typically results in weaker adhesion between the retroreflective elements and the binder layer. It is believed that dwell times which are typically encountered during commercial production, e.g., dwell times of less than 3 days, will typically result in a much stronger adhesion between the retroreflective elements and the binder layer than if dwell times of several weeks were encountered.

Binder layer 16 is typically between about 50 and about 250 microns (2 and 10 mils) thick over the embedded portion of retroreflective elements 12, with thicknesses of between about 75 and about 100 microns (3 and 4 mils) typically being preferred. It will be understood that binder layers having thicknesses outside these ranges may be used. However, if binder layer 16 is too thin, it will not provide sufficient support to retroreflective elements 12 which will be readily dislodged, whereas increasing the thickness of binder layer 16 leads to increased cost for applique 10 as greater amounts of the binder material are required. Furthermore, at greater thicknesses, greater e-beam dosages will be required to achieve suitable curing, and the flexibility of applique 10 typically decreases.

Binder layer 16 consists essentially of the binder materials, i.e., certain e-beam curable polymers discussed herein, with the additives discussed below. The e-beam curable binder materials used in appliques of the invention offer improved performance as compared to that of binder materials used in previously known retroreflective appliques. For instance, phenolic-cured nitrile rubbers have been found to be sensitive to high temperature and high pH, resulting in discoloration and loss of retroreflective brightness. The presence of the phenolic functionalities is believed to make such binder layers susceptible to undesirable degradation. Two component urethanes have been found to be sensitive to degradation upon exposure to high moisture as well as high temperature and high pH wash conditions. The urethane linkages are believed to make such binder layers susceptible to undesirable degradation. Such materials are also typically relatively expensive. Moisture-cured one component urethanes suffer similar drawbacks and, in addition, are slow and difficult to cure controllably. If overcured, such binder layers tend to become insufficiently flexible and subject to loss of retroreflective elements when flexed.

Binder layer 16 comprises an e-beam curable polymer and typically one or more crosslinkers and one or more coupling agents. If desired, it may also comprise such optional additives as colorants (e.g., pigments, dyes, metal flakes) and stabilizers (e.g., thermal stabilizers and antioxidants such as hindered phenols and light stabilizers such as hindered amines or ultraviolet stabilizers), flame retardants, and flow modifiers (e.g., surfactants such as fluoropolymers or silicones). Preferred colorants for appliques with retroreflective elements having aluminum reflector layers are black dyes, e.g., metalazo dyes such as chromium-azo dyes.

Polymers which may be used herein are e-beam curable. Illustrative examples thereof include chlorosulfonated polyethylenes, ethylene copolymers comprising at least about 70 weight percent of polyethylene such as ethylene/vinyl acetate, ethylene/acrylate, and ethylene/acrylic acid, and poly(ethylene-co-propylene-co-diene) ("EPDM") polymers. In the ethylene copolymers, it is believed that the polyethylene content should be at least about 70 weight percent because ethylene copolymers having this polyethylene content will typically have a higher hydrophobicity than other ethylene copolymers. A higher hydrophobicity of the ethylene copolymer is believed to be significant in terms of the copolymer's ability to resist degradation due to exposure to harsh laundering conditions including high pH, high laundering temperatures, and chemical attack by the laundering agent. Use of ethylene copolymers having the polyethylene content described above prevents or reduces swelling of the binder layer during laundering and consequent loss of retroreflective elements and prevents or reduces the degradation (hydrolysis) of any aluminum reflector layer which forms part of the retroreflective elements of the applique.

The HYPALON TM series of chlorosulfonated polyethylenes from E.I. du Pont de Nemours & Co. ("du Pont") are typically preferred for use in appliques of the invention because these e-beam curable materials are highly flexible, and have been found to be resistant to degradation by exposure to ozone, oxygen, weathering, oil, and many chemicals as well as harsh laundering conditions. HYPALON TM 20 elastomer has been found to be most preferred. Appliques comprising the e-beam curable ethylene copolymers and EPDM polymers discussed above exhibit a surprising resistance to degradation due to exposure to harsh laundering conditions but tend to be less flexible than appliques comprising a HYPALON TM elastomer in the binder layer.

Some polymers tend to be degraded by e-beam irradiation rather than crosslinked. For instance, nitrile rubbers such as HYCAR TM 1001 and HYCAR TM 1032 available from B.F. Goodrich Co., polyisobutylene, butyl rubber (e.g., isoprene/isobutylene copolymer), and neoprenes (e.g., polychloroprene) are typically not useful herein. The laundering performance of KRATON TM FG1901 X block copolymer, a styrene-ethylene/butylenestyrene block copolymer grafted with 2% maleic anhydride, is not improved by e-beam irradiation but not necessarily degraded by e-beam irradiation. The binder layers of appliques of the invention are preferably substantially free of all of these components. Other polymers such as a KRATON TM D1320X elastomer can be advantageously cured by e-beam irradiation but will not result in appliques having superior resistance to degradation due to harsh laundering conditions.

Illustrative examples of crosslinkers which may be used herein include multifunctional monomers and oligomers such as trimethylolpropane trimethacrylate, pentaerythritol triacrylate, and triallyl-1,3,5-triazine-2,4,6(1H,3H,5H)trione. Illustrative examples of other useful crosslinkers include 1,6-hexanediol diacrylate, tetraethylene glycol diacrylate, neopentylglycol diacrylate, tripropylene glycol diacrylate, trimethylolpropane ethoxy triacrylate, tris(2-hydroxethyl) isocyanurate triacrylate, dipentaerythritol pentaacrylate, urethane acrylate oligomers (e.g., CN970 series from Sartomer Co. and EBERCRYL TM from Radcure Specialties, Inc.), epoxy acrylate oligomers, and acrylic oligomers.

Crosslinkers may be used alone or in combination of one or more. Typically, the binder layer will contain up to about 10 weight percent, and preferably between about 0.5 and about 2 weight percent, of crosslinker. Pentaerythritol triacrylate is the most preferred crosslinker at least when the crosslinker is present in the binder layer at about a 1 weight percent concentration or less. If too much crosslinker is used, the resultant binder layer may tend to be insufficiently flexible. Also, because many crosslinkers tend to be susceptible to degradation due to water and high pH, binder layers made with excessive amounts may tend to suffer impaired launderability. If too little crosslinker is used, the resultant binder layer may not be cured sufficiently and thus be subject to degradation, e.g., swelling and retroreflective element loss, under laundering conditions, or require high e-beam dosage to achieve sufficient cure. Typically, it is preferred that the binder layer be sufficiently cured so as to withstand immersion in methylene chloride at room temperature for 24 hours without dissolving or breaking apart. Acceptable binder layers may swell in this test so long as they do not dissolve or break apart. It will be understood that use of higher e-beam dosages to achieve sufficient curing will typically incur greater processing costs and perhaps slower manufacturing speeds. Also, higher e-beam dosages may lead to degradation of some components of the construction.

Typically, binder layer 16 will comprise a coupling agent, e.g., silane coupling agent, to promote adhesion of binder layer 16 to retroreflective elements 12. Selection of a coupling agent will be based in part upon the particular e-beam curable polymer, crosslinker (if any), and retroreflective elements which are used. Illustrative examples of coupling agents include vinyltrimethoxysilane, vinyltriethoxysilane, gamma-methacryloxypropyl-tris-(2-methoxyethoxy)silane, gamma-methacryloxypropyltrimethoxysilane, beta-(3,4-epoxycyclohexyl)ethyltrimethoxysilane, gamma-glycidoxypropyltrimethoxysilane, gamma-mercaptopropyltriethoxysilane, gamma-mercaptopropyltrimethoxysilane, gamma-aminopropyltriethoxysilane, and N-beta-(aminoethyl)-gamma-aminopropyltrimethoxysilane. These may be used singly or in combination. It will be understood that selection of coupling agent(s), if used, will be dependent in part upon the binder material and retroreflective elements used. To minimize fading of aluminum reflector layers, it is typically preferred that amino-containing silane coupling agents be avoided. Gamma-glycidoxypropyltrimethoxysilane, gamma-mercaptopropyltrimethoxysilane, and gamma-methacryloxypropyltrimethoxysilane have been found to exhibit the best performance among those listed and are preferred.

The coupling agent may be applied, e.g., by spraying or coating, to the surfaces of the retroreflective elements or to the binder layer prior to its application to the elements or may be incorporated directly into the binder composition. Application to the elements provides the advantage of using lesser quantities of coupling agent, which in some instances is relatively expensive, whereas incorporation into the binder composition provides the advantage of eliminating a separate application process during fabrication of the retroreflective applique.

Typically, binder layer 16 will contain up to about 10 weight percent, and preferably between about 0.1 and about 7 weight percent, of coupling agent. If too little coupling agent is used, the resultant applique may, depending upon the characteristics of the elastomer, tend to suffer undesirable loss of retroreflective elements. If too much coupling agent is used, it may in some instances impair the physical properties of the binder layer, e.g., mercapto-based agents may cause the binder to swell. Also, the coupling agents are typically relatively expensive as compared to the other components of the appliques.

EXAMPLES

The invention will be further explained by the following illustrative examples which are intended to be non-limiting. Unless otherwise indicated, all amounts are expressed in parts by weight.

Unless otherwise indicated, the following test methods were used.

Retroreflective Brightness

Retroreflective brightness was measured using a retroluminometer as described in U.S. defensive publication T987,003 at divergence angles of about 0.2° and entrance angles of about −4°.

Laundering

Launderability of appliques was evaluated by washing a piece of fabric to which the subject applique had been applied for the indicated number of cycles in a Milnor System 7 Washing Machine Model 30015M4G from Pellerin Milnor Corp. using program no. 5 for medium soiled, colored fabric with the indicated detergent. Each cycle was about 40 minutes in length. The washer was loaded with about 5.5 to 6.8 kilograms (12 to 15 pounds) (dry) of laundry and used about 68 liters (18 gallons) of water at the indicated temperature.

The detergent used was 30 grams of FACTOR TM detergent, a detergent from Fabrilife Chemicals, Inc. containing tetrasodium pyrophosphate, nonylphenoxypoly(ethyleneoxy)ethanol, sodium carbonate, and silica. In some cases, the detergent further included 60 grams of ULTRASIL TM pH builder, a pH builder from Pennwalt Corp. believed to contain 40 weight percent NaOH and 60 weight percent sodium metasilicates.

Example 1

Glass microspheres having an average diameter of about 40 to 90 microns were partially embedded into a temporary carrier sheet and aluminum specular reflective layers applied to the exposed portions of the microspheres to yield retroreflective elements.

A binder composition comprising:

| Amount | Component |
|---|---|
| 100 | Elastomer - 35 weight percent solution of HYPALON TM 20 in methyl ethyl ketone with about 0.045 weight percent of ZAPON TM X50, black dye from BASF Corp.; |
| 2.1 | Coupling Agent - A-189, a gamma-mercaptopropyltrimethoxysilane from Union Carbide Corp.; and |
| 0.35 | Crosslinker - trimethylolpropane trimethacrylate having molecular weight of 338.4 from Aldrich Chemical Co.; | was coated over the retroreflective elements with a dwell time of about 4 weeks to a wet thickness of about 300 microns (12 mils) and dried at about 66° C. (150° F.) for 30 minutes. The dried coating was then e-beam irradiated to an exposure of 3 or 5 Mrads at 200 kilovolts to yield the binder layer. An Mrad is a megarad where a rad or "radiation absorbed dose" is equal to 100 ergs/gram.

An adhesive layer comprising (1) 100 parts of a 40 weight percent solids solution in methyl ethyl ketone of a polyether polyol having a hydroxy equivalent weight of 3000 and (2) 6.5 parts of MONDUR TM CB-75, a 75 percent solids solution in ethyl acetate of an aromatic polyisocyanate adduct based on toluene diisocyanate from Mobay Corp., was then coated over the rear side of the binder layer to a wet thickness of about 300 microns (12 mils).

The resultant retroreflective applique was then wet laminated to a polyester fabric (S-551-060 from Milliken & Company, a 3.11 ounce/yard² textile polyester) and the construction dried and cured at 66° C. (150° F.) for 30 minutes. The temporary carrier was then stripped from the front of the applique to reveal the silver colored retroreflective surface. Launderablility of the appliques was evaluated by washing for the indicated number of cycles at a water temperature of about 83° C. (180° F.). The appliques had initial retroreflective brightnesses in candelas per square meter per lux ("cpl") of about 605, 570, 600, and 615, respectively. The launderability results obtained are tabulated in Table I.

TABLE I

| Cure[1] | Cycles[2] | Agent[3] | Brightness[4] |
|---|---|---|---|
| 3 | 0 | F + U | 100 |
| 3 | 5 | F + U | 82 |

TABLE I-continued

| Cure[1] | Cycles[2] | Agent[3] | Brightness[4] |
|---|---|---|---|
| 3 | 10 | F + U | 53 |
| 3 | 15 | F + U | 35 |
| 3 | 20 | F + U | 25 |
| 3 | 25 | F + U | 20 |
| 5 | 0 | F + U | 100 |
| 5 | 5 | F + U | 79 |
| 5 | 10 | F + U | 46 |
| 5 | 15 | F + U | 29 |
| 5 | 20 | F + U | 19 |
| 5 | 25 | F + U | 15 |
| 3 | 0 | F | 100 |
| 3 | 5 | F | 88 |
| 3 | 10 | F | 76 |
| 3 | 15 | F | 71 |
| 3 | 20 | F | 58 |
| 3 | 25 | F | 52 |
| 3 | 30 | F | 40 |
| 5 | 0 | F | 100 |
| 5 | 5 | F | 89 |
| 5 | 10 | F | 72 |
| 5 | 15 | F | 64 |
| 5 | 20 | F | 52 |
| 5 | 25 | F | 44 |
| 5 | 30 | F | 33 |

[1] E-beam exposure in Mrads.
[2] Number of wash cycles completed.
[3] Cleaning agent(s) used - F indicates FACTOR ™ and U indicates ULTRASIL ™.
[4] Percentage of its initial retroreflective brightness that indicated sample retained after indicated number of wash cycles.

These results illustrate the superior launderability of retroreflective appliques of the invention as compared to conventional appliques made with thermo-chemically cured binder layers.

Example 2

Two different crosslinkers were examined in Example 2. Except as noted below, retroreflective appliques were made as in Example 1. In Sample 2-1 the crosslinker was 0.35 parts of trimethylolpropane trimethacrylate, and in Sample 2-2 the crosslinker was 0.35 parts of pentaerythritol triacrylate. In both cases, the binder composition was coated over the retroreflective elements with a dwell time of about 17 weeks to a wet thickness of 250 microns (10 mils), oven dried at 66° C. (150° F.) for 10 minutes, covered with a 25 micron (1 mil) thick silicone coated polyethylene terephthalate film, and exposed to 5 Mrads at 200 kilovolts through the film.

After the film was removed, an adhesive composition comprising (1) 100 parts of a 50 percent solids solution of VITEL ™ 5545, a linear saturated polyester from Goodyear Co., in methyl ethyl ketone and toluene and (2) 2.4 parts of MONDUR ™ CB-75 was applied over the rear side of the binder layer. The applique was then wet laminated to an S-551-060 polyester fabric as in Example 1.

After the temporary carriers were removed from the front of the appliques, the appliques were allowed to sit at room ambient conditions for 1 month. The launderability of the samples was then evaluated by washing as in Example 1 for the indicated number of cycles using FACTOR ™ detergent with ULTRASIL ™ pH builder and water having a temperature of about 74° C. (165° F.). The appliques had initial retroreflective brightnesses (in cpl) of about 615 and 620, respectively. The launderability results obtained are tabulated in Table II.

TABLE II

| Sample | Cycles[1] | Brightness[2] |
|---|---|---|
| 2-1 | 0 | 100 |
| | 5 | 39 |
| | 10 | 11 |
| | 15 | 4 |
| | 20 | 1.6 |
| 2-2 | 0 | 100 |
| | 5 | 64 |
| | 10 | 41 |
| | 15 | 27 |
| | 20 | 16 |

[1] Number of wash cycles completed.
[2] Percentage of its initial retroreflective brightness that indicated sample retained after indicated number of wash cycles.

Based upon the data of Example 2, pentaerythritol triacrylate is the most preferred crosslinker for use in appliques of the invention. Secondly, it is believed that the 17-week dwell time had a significant effect on the launderability results obtained for both Samples 2-1 and 2-2 and explains the decreased laundering performance relative to the results obtained in Example 1 and Comparative Examples A, B, and D discussed below.

Example 3

A monolayer of retroreflective elements was prepared as in Example 1.

After a dwell time of about 4 weeks, a binder composition comprising:

| Amount | Component |
|---|---|
| 100 | Elastomer - solution in methyl ethyl ketone of 35 weight percent HYPALON ™ 20 and 0.045 weight percent ZAPON ™ X50; |
| 2.1 | Coupling Agent - A-189; |
| 0.35 | Crosslinker - trimethylolpropane trimethacrylate; | was coated over the retroreflective elements to a wet thickness of about 375 microns (15 mils). Appliques were then wet laminated to a PRIMALUX ™ fabric (an 80/20 blend of polyester and combed cotton, weight 3 ounce/yard$^2$) from Springs Industries, Inc. (referred to as Sample 3-1) and an S-551-060 fabric like that used in Example 1 (referred to as Sample 3-2). These composites were dried at about 66° C. (150° F.) for 30 minutes. The dried composites were then e-beam irradiated to an exposure of 7 Mrads at 300 kilovolts through the fabrics to yield the binder layers bonded to the respective fabric substrate.

The temporary carriers were then stripped from the front of the appliques to reveal the retroreflective surfaces.

Launderability of the appliques was evaluated by washing for five cycles using FACTOR ™ detergent with ULTRASIL ™ pH builder at a water temperature of about 82° C. (180° F.).

Sample 3-1 had an initial retroreflective brightness of about 625 candela per square meter per lux and a final retroreflective brightness of about 270 candela per square meter per lux. Sample 3-2 had an initial retroreflective brightness of about 620 candela per square meter per lux and a final retroreflective brightness of about 300 candela per square meter per lux. Thus, Sample 3-2 was observed to have retained a somewhat greater degree of its retroreflective brightness than did Sample 3-1. This is believed to be due to the fact that S-551-060 fabric is somewhat stiffer than is PRIMALUX ™ fabric.

The 4-week dwell time and/or the use of the binder composition as the adhesive layer are/is believed to account for the decreased laundering performance of the appliques of Example 3 relative to the appliques of Comparative Examples A, B, and D, and Example 1. It is believed that when the binder layer also functions as the adhesive layer for securing the applique to a garment, laundering performance suffers because the binder layer is typically thicker by necessity and because in general, a good binder for securing retroreflective elements in place is typically not a good adhesive for securing the applique to a garment (in fact, delamination can sometimes occur). Although the appliques of Example 3 are not superior relative to the appliques of Example 1, they can be produced at a lower cost because a separate adhesive layer is not utilized.

Example 4

Two different concentrations of the trimethylolpropane trimethacrylate crosslinker were examined in Example 4. Except as noted below, retroreflective appliques were made as in Example 1. In Sample 4-1, 0.18 parts of crosslinker were used (the crosslinker concentration was 0.5 weight percent based on total solids), and in Sample 4-2, 0.53 parts of crosslinker were used (the crosslinker concentration was 1.4 weight percent based on total solids). In both cases, the binder composition comprised 0.4 weight percent concentration based on total solids of MICROLITH TM Black C-T, a carbon black pigment predispersed in modified rosin ester resin from Ciba-Geigy Corp., rather than ZAPON TM X50 black dye. In both cases, after a dwell time of about 3 weeks, the binder composition was coated to a wet thickness of 300 microns (12 mils), oven dried at 66° C. (150° F.) for 30 minutes, covered with a 25 micron (1 mil) thick silicone coated polyethylene terephthalate film, and exposed to 3 Mrads at 200 kilovolts through the film.

After the film was removed, the same adhesive composition used in Example 1 was applied. The applique was then wet laminated to a PRIMALUX TM fabric, and the construction Was dried and cured at 66° C. (150° F.) for 30 minutes. The temporary carrier was then stripped from the front of the applique to reveal the silver colored retroreflective surface.

Launderability of the applique was evaluated by washing for the indicated number of cycles using FACTOR TM detergent with ULTRASIL TM pH builder at a water temperature of about 77° C. (170° F.). The appliques had initial brightnesses of about 600 cpl. The launderability results obtained are tabulated in Table III below and compared with the results obtained in Comparative Example B.

Comparative Example A

An array of retroreflective elements on a temporary carrier was prepared as in Example 1.

After a dwell time of less than 3 days, a binder composition comprising:

| Amount | Component |
|---|---|
| 100 | Binder Material - 45 weight percent solids emulsion in water of non-ionic acrylic emulsion, RHOPLEX TM HA-8 from Rohm & Haas; |
| 2 | Binder Material - 80 weight percent aqueous solution of melamine-formaldehyde resin; and |
| 2 | Coupling Agent - Z-6040, a gamma-glycidoxypropyltrimethoxysilane from Dow Corning Corp.; | was coated over the retroreflective elements to a wet thickness of about 150 microns (6 mils) and dried and cured at 82° C. (180° F.) for 7 minutes to yield the binder layer.

A layer of the same composition except further containing 0.2 parts carbon black and 3.0 parts titanium dioxide was coated over the back side of the binder layer to a wet thickness of about 175 microns (7 mils).

The applique was then wet laminated to a POTENTIA TM fabric, a 3.0 ounce/yard$^2$ 65/35 blend of polyester and combed cotton from Springs Industries, Inc., and the laminate was dried and cured at 110° C. (230° F.) for 7 minutes.

The temporary carrier was then stripped from the front of the applique to reveal the silver colored retroreflective surface. The initial retroreflective brightness was about 605 cpl.

Comparative Example B

An array of retroreflective elements on a temporary carrier was prepared as in Example 1.

After a dwell time of less than 3 days, a binder composition comprising:

| Amount | Component |
|---|---|
| 100 | Binder Material - 20.5 weight percent solids solution in methyl ethyl ketone of nitrile rubber; |
| 13.7 | Binder Material - thermosetting phenolic resin; |
| 4.1 | Binder Material - dioctyl phthalate plasticizer; |
| 2 | Coupling Agent - A-189; and |
| 2 | Colorant - dispersion of carbon black and titanium dioxide; | was coated over the retroreflective elements to a wet thickness of about 150 microns (6 mils) and dried and cured at 77° C. (170° F.) for 3 minutes and then 154° C. (310° F.) for 4 minutes to yield the binder layer.

An adhesive composition comprising: (1) 100 parts of BOSTIK TM 7660, a 30 weight percent solids solution in methyl ethyl ketone of a polyester diol from Emhart Corp. and (2) 4 parts of BOSCODUR TM No. 22, a 66 weight percent solids solution in ethyl acetate and toluene (1:1) of a polyisocyanate from Emhart Corp., was coated over the back side of the binder layer to a wet thickness of 175 microns (7 mils).

The applique was then wet laminated to a PRIMALUX TM fabric, and the construction was dried and cured at 66° C. (150° F.) for 30 minutes. The temporary carrier was then stripped from the front of the applique to reveal the silver colored retroreflective surface.

Launderability of the applique was evaluated by washing for the indicated number of cycles using FACTOR TM detergent with ULTRASIL TM pH builder at a water temperature of 83° C. (180° F.). The initial retroreflective brightnesses of the appliques tested ranged from about 560 to about 600 cpl. The launderability results obtained with one of the appliques are tabulated in Table III and compared with the launderability results of Example 4. The launderability results obtained with two other appliques of Comparative Example B are tabulated in Table IV and compared with the launderability results of Example 1 and Comparative Examples A, C, and D.

TABLE III

| Cycles[1] | Brightness[2] | | |
|---|---|---|---|
| | 4-1 | 4-2 | B |
| 0 | 100 | 100 | 100 |
| 5 | 70 | 80 | 65 |
| 10 | 45 | 36 | 27 |

[1]Number of wash cycles completed.
[2]Percentage of its initial retroreflective brightness that indicated sample retained after indicated number of wash cycles.

Although the adhesives used in the appliques of Example 4 and Comparative Example B were slightly different, this difference is not believed to be significant in determining the laundering performance of the appliques. More importantly for purposes of determining retained brightness under laundering conditions, each applique compared in Table III comprised a PRIMA-LUX TM fabric.

Comparative Example C

In this Comparative Example, a piece of REFLITE TM Retroreflective Fabric from Nippon Reflite Industry Company of Uji-City, Japan was evaluated. The material comprises a monolayer of aluminum-coated microspheres partially embedded in a binder layer which is believed to comprise a urethane binder material.

The fabric had an initial retroreflective brightness of about 630 cpl.

Comparative Example D

An array of retroreflective elements on a temporary carrier was prepared as in Example 1.

After a dwell time of less than 3 days, a binder composition was coated over the retroreflective elements. The binder composition was the same as the binder composition used in Comparative Example B except no coupling agent or colorants were included. The binder composition was coated over the retroreflective elements, dried and cured in the same manner as described in Comparative Example B.

An adhesive composition comprising: (1) 100 parts of a binder material comprising 13.7 weight percent of ESTANE TM 5703 (thermoplastic urethane from B. F. Goodrich), 21.4 weight percent of titanium dioxide, and 11.9 weight percent of flame retardants in methyl ethyl ketone and diacetone alcohol, and (2) 2 parts of MONDUR TM CB-75 was then coated over the back side of the binder layer to a wet thickness of about 300 microns (12 mils).

The applique was then wet laminated to a TRICOT TM fabric (a 94/6 blend of polyester and nylon from Apex Mills Corp. believed to have a weight of about 3.9 ounce/yard$^2$), and the construction was dried and cured as described in Example 1. The temporary carrier was then stripped from the front of the applique to reveal the silver colored retroreflective surface. The initial retroreflective brightness was about 600 cpl.

The launderability results obtained with the two 3 Mrad irradiated appliques of Example 1 and the appliques of Comparative Examples A, B, C, and D are tabulated in Table IV. As reported above, the initial retroreflective brightnesses of the two 3 Mrad irradiated appliques of Example 1 were about 605 and 600 cpl, respectively.

TABLE IV

| Cycles | Agent[2] | Brightness[3] | | | | |
|---|---|---|---|---|---|---|
| | | 1 | A | B | C | D |
| 0 | | 100 | — | 100 | 100 | 100 |
| 5 | F + U | 82 | — | 67 | <2 | 80 |
| 10 | F + U | 53 | — | 21 | — | 44 |
| 15 | F + U | 35 | — | 4 | — | 15 |
| 20 | F + U | 25 | — | <1 | — | 4 |
| 0 | | 100 | 100 | 100 | — | — |
| 5 | F | 88 | 83 | 79 | — | — |
| 10 | F | 76 | 71 | 62 | — | — |
| 15 | F | 71 | 55 | 47 | — | — |
| 20 | F | 58 | 42 | 32 | — | — |
| 25 | F | 52 | 30 | 20 | — | — |
| 30 | F | 40 | 23 | 11 | — | — |

[1]Number of wash cycles completed at water temperature of 83° C. (180° F.) except Comparative Example C which was at 66° C. (150° F.).
[2]Cleaning Agent(s) used - F indicates FACTOR TM and U indicates ULTRASIL TM.
[3]Percentage of its initial retroreflective brightness that indicated sample retained after indicated number of wash cycles.

Comparative Example E

A monolayer of retroreflective elements was prepared as in Example 1.

After a dwell time of about 7 weeks, a binder composition comprising:

| Amount | Component |
|---|---|
| 100 | Binder Material - a 40 percent solids solution in methyl ethyl ketone of a polyol having a hydroxy equivalent weight of 3000; |
| 5.2 | Binder Material - MONDUR TM CB-75; and |
| 1.2 | Coupling Agent - A-187, a gamma-glycidoxypropyltrimethoxy silane from Union Carbide Corp.; | was coated over the retroreflective elements to a wet thickness of about 250 microns (10 mils) and dried and cured at 66° C. (150° F.) for 30 minutes to yield the binder layer. This binder composition was also used as the adhesive and coated over the back side of the binder layer to a wet thickness of about 250 microns (10 mils). The applique was then wet laminated to an S-551-060 polyester fabric, and the construction was dried and cured as described in Example 1. The temporary carrier was then removed from the front of the applique to reveal the silver colored retroreflective surface. The initial retroreflective brightness was about 586 cpl.

Comparative Example F

A monolayer of retroreflective elements was prepared as in Example 1.

After a dwell time of about 7 weeks, a binder composition comprising:

| Amount | Component |
|---|---|
| 100 | Binder Material - a 32 weight percent solids solution in methyl isobutyl ketone of FLUOREL TM FC2145, a copolymer of vinylidene fluoride and heptafluoropropylene from 3M Co.; and |
| 1.9 | Coupling Agent - A-189; | was coated over the retroreflective elements to a wet thickness of about 300 microns (12 mils) and dried and cured at about 66° C. (150° F.) for 30 minutes to yield the binder layer.

The same adhesive composition used in Comparative Example E was coated over the back side of the binder layer to a wet thickness of about 250 microns (10 mils).

The applique was then wet laminated to an S-551-060 polyester fabric, and the construction was dried and cured as described in Example 1. The temporary carrier was then removed from the front of the applique to reveal the silver colored retroreflective surface. The initial retroreflective brightness was about 600 cpl.

Launderability of the appliques of Comparative Examples E and F was evaluated by washing for the indicated number of cycles with FACTOR TM detergent and ULTRASIL TM pH builder at a water temperature of about 83° C. (180° F.). These launderability results are tabulated together in Table V with the first five rows of data of Table I because each applique comprised the same fabric and similar adhesive layers. The data transferred from Table I relate to evaluation of the 3 Mrad irradiated applique of Example 1, which applique was evaluated using the same cleaning agents and laundering conditions used in evaluating the appliques of Comparative Examples E and F.

TABLE V

| Cycles[1] | Brightness[2] | | |
|---|---|---|---|
| | 1 | E | F |
| 0 | 100 | 100 | 100 |
| 5 | 82 | 6 | <1 |
| 10 | 53 | — | — |
| 15 | 35 | — | — |
| 20 | 25 | — | — |

[1] Number of wash cycles completed.
[2] Percentage of its initial retroreflective brightness that indicated sample retained after indicated number of wash cycles.

These results illustrate the superior launderability of retroreflective appliques of the invention as compared to conventional appliques made with thermo-chemically cured binder layers.

Various modifications and alterations of this invention will become apparent to those skilled in the art without departing from the scope and spirit of this invention.

What is claimed is:

1. A retroreflective applique comprising a monolayer of retroreflective elements partially embedded in and protruding from the front surface of a binder layer wherein said binder layer comprises an electron-beam cured polymer selected from the group consisting of: chlorosulfonated polyethylenes, ethylene copolymers comprising at least about 70 weight percent of polyethylene, and EPDM polymers, said applique being applied to a garment.

2. The applique of claim 1 wherein said electron-beam cured polymer comprises a chlorosulfonated polyethylene elastomer.

3. The applique of claim 1 wherein said binder layer further comprises an additive selected from the group consisting of: crosslinkers, coupling agents, colorants, stabilizers, flame retardants, and flow modifiers.

4. The applique of claim 3 wherein said crosslinker is present in said binder layer in a concentration of less than about 10 weight percent and is selected from the group consisting of multifunctional monomers and oligomers.

5. The applique of claim 4 wherein said crosslinker is selected from the group consisting of: trimethylolpropane trimethacrylate, pentaerythritol triacrylate, triallyl-1,3,5-triazine-2,4,6(1H,3H,5H)trione, 1,6-hexanediol diacrylate, tetraethylene glycol diacrylate, neopentylglycol diacrylate, tripropylene glycol diacrylate, trimethylolpropane ethoxy triacrylate, tris(2-hydroxethyl) isocyanurate triacrylate, dipentaerythritol pentaacrylate, urethane acrylate oligomer, epoxy acrylate oligomer, and acrylic oligomer.

6. The applique of claim 3 wherein said coupling agent is selected from the group consisting of: vinyltrimethoxysilane, vinyltriethoxysilane, gamma-methacryloxypropyl-tris-(2-methoxyethoxy)silane, gamma-methacryloxypropyltrimethoxysilane, beta-(3,4-epoxycyclohexy)ethyltrimethoxysilane, gamma-glycidoxypropyltrimethoxysilane, gamma-mercaptopropyltriethoxysilane, gamma-mercaptopropyltrimethoxysilane, gamma-aminopropyltriethoxysilane, and N-beta-(aminoethyl)-gamma-aminopropyltrimethoxysilane.

7. The applique of claim 1 further comprising a layer of adhesive on the rear surface of said binder layer, wherein said applique is bonded to said garment with said adhesive.

8. The applique of claim 7 wherein said adhesive is a hot melt adhesive.

9. The applique of claim 1 wherein said retroreflective elements comprise microspheres with hemispheric reflectors thereon.

10. The applique of claim 9 wherein said reflectors comprise vapor-coated aluminum.

11. The applique of claim 9 wherein said reflectors comprise dielectric vapor coats.

12. The applique of claim 1 wherein said applique is sewn to said garment.

13. The applique of claim 1 wherein said electron-beam cured polymer comprises an ethylene copolymer comprising at least about 80 weight percent of polyethylene.

14. The applique of claim 1 wherein said electron-beam cured polymer comprises an ethylene copolymer comprising at least about 90 weight percent of polyethylene.

* * * * *

UNITED STATES PATENT AND TRADEMARK OFFICE
CERTIFICATE OF CORRECTION

PATENT NO. : 5,283,101

DATED : February 1, 1994

INVENTOR(S) : Wu-Shyong Li

It is certified that error appears in the above-identified patent and that said Letters Patent is hereby corrected as shown below:

In Column 11, Line 42, the word "Was" should not be capitalized.

In Column 15, Line 4, the word "Iaminated" should read --laminated--.

Signed and Sealed this

Fifteenth Day of November, 1994

Attest:

BRUCE LEHMAN

Attesting Officer     Commissioner of Patents and Trademarks